US009286562B2

(12) United States Patent
Forster

(10) Patent No.: US 9,286,562 B2
(45) Date of Patent: Mar. 15, 2016

(54) RFID-BASED DEVICES AND METHODS FOR INTERFACING WITH A SENSOR

(71) Applicant: Avery Dennison Corporation, Pasadena, CA (US)

(72) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 188 days.

(21) Appl. No.: 13/659,964

(22) Filed: Oct. 25, 2012

(65) Prior Publication Data

US 2013/0099897 A1  Apr. 25, 2013

Related U.S. Application Data

(60) Provisional application No. 61/550,941, filed on Oct. 25, 2011.

(51) Int. Cl.
*H04Q 5/22* (2006.01)
*G06K 19/07* (2006.01)

(52) U.S. Cl.
CPC ........ *G06K 19/0716* (2013.01); *G06K 19/0717* (2013.01)

(58) Field of Classification Search
CPC .................. G06K 7/0008; G06K 19/0723
USPC ............ 340/10.1, 10.2, 10.41; 343/745
See application file for complete search history.

(56) References Cited

U.S. PATENT DOCUMENTS

| 6,825,773 B1* | 11/2004 | O'Toole et al. ............ 340/13.25 |
| 7,038,470 B1 | 5/2006 | Johnson |
| 7,456,744 B2 | 11/2008 | Kuhns et al. |
| 7,986,218 B2* | 7/2011 | Watters et al. ............. 340/10.41 |
| 8,179,231 B1* | 5/2012 | Varahramyan et al. ...... 340/10.1 |
| 2004/0113790 A1* | 6/2004 | Hamel et al. ................ 340/572.1 |
| 2007/0090926 A1 | 4/2007 | Potyrailo et al. |
| 2007/0090927 A1 | 4/2007 | Potyrailo et al. |
| 2007/0091006 A1* | 4/2007 | Thober et al. ................. 343/745 |
| 2008/0061965 A1 | 3/2008 | Kuhns et al. |
| 2010/0040191 A1* | 2/2010 | Ubarretxena Belandia et al. ............................. 377/25 |

(Continued)

FOREIGN PATENT DOCUMENTS

| DE | 102009005100 | 7/2010 |
| EP | 2375362 | 10/2011 |

(Continued)

OTHER PUBLICATIONS

International Search Report dated Jan. 14, 2013 for International Application No. PCT/US2012/061773 filed Oct. 25, 2012.

(Continued)

*Primary Examiner* — Benjamin C Lee
*Assistant Examiner* — Israel Daramola
(74) *Attorney, Agent, or Firm* — Avery Dennison Retail Information Services, LLC

(57) ABSTRACT

A sensor is provided with an RFID reader, RFID chip, and an antenna electrically coupled to the RFID chip and configured to received signals from and transmit signals to the RFID reader. A sensing material is also electrically connected to the RFID chip and has a variable electrical property. The RFID chip is configured to modulate a signal received by the antenna and drive the sensing material using the modulated signal.

14 Claims, 5 Drawing Sheets

(56) References Cited

U.S. PATENT DOCUMENTS

| | | |
|---|---|---|
| 2010/0073135 A1 | 3/2010 | Potyrailo et al. |
| 2010/0141273 A1 | 6/2010 | Potyrailo et al. |
| 2010/0225448 A1* | 9/2010 | Arguin .................. 340/10.1 |
| 2010/0308970 A1* | 12/2010 | Rofougaran et al. ........ 340/10.1 |
| 2011/0090058 A1* | 4/2011 | Ikemoto .................. 340/10.1 |
| 2012/0068830 A1* | 3/2012 | Caveney et al. ............ 340/10.2 |
| 2012/0116683 A1* | 5/2012 | Potyrailo et al. ................ 702/19 |

FOREIGN PATENT DOCUMENTS

| | | | |
|---|---|---|---|
| WO | 2011037234 | 3/2011 | |
| WO | WO 2011146766 A1 * | 11/2011 | ............ H04L 5/0007 |

OTHER PUBLICATIONS

International Preliminary Report and Written Opinion dated Apr. 29, 2014 for International Application No. PCT/US2012/061773 filed Oct. 25, 2012.

* cited by examiner

RFID-BASED DEVICES AND METHODS FOR INTERFACING WITH A SENSOR

CROSS-REFERENCE TO RELATED APPLICATION

The present application claims the benefit of U.S. Provisional Application No. 61/550,941 filed Oct. 25, 2011, which is incorporated herein by reference in its entirety.

FIELD OF THE DISCLOSURE

The present subject matter relates to radio frequency identification ("RFID") devices. More particularly, the present subject matter relates to RFID devices used in combination with sensors.

DESCRIPTION OF THE RELATED ART

Sensors are known for use in analyzing one or more characteristics of the environment in which they are located including, but not limited to, temperature, liquid level, and acoustic transmission velocity. Examples of resonant sensors include tuned circuits (electrical resonators) and quartz crystals (acousto-electrical resonators). The sensor may be configured such that at least one of its properties may be influenced by the characteristic of interest in the environment. In the example of a resonant sensor, the resonant frequency of the sensor is affected by the characteristic of interest. Accordingly, the resonant frequency of the sensor is indicative of the magnitude or presence of the characteristic of interest and a change in the magnitude of such characteristic is reflected in a change in the resonant frequency of the sensor. An associated receiving device is configured to detect or receive a signal from the sensor and analyze the same to determine the nature and/or magnitude of the characteristic of interest in the environment, including any changes in the environment.

One possible disadvantage of known resonant sensors is the difficulty in accurately assessing the state of a resonant sensor due to environmental noise. One approach to this disadvantage has been to incorporate RFID technology into the sensors, as described in US Patent Application Publication Nos. 2007/0090926 and 2010/0141273, which are incorporated herein by reference. Such systems help to reduce the effect of environmental noise, thereby allowing for more accurate assessment of the state of the resonant sensor, but there is still room for improvement of such known sensors incorporating RFID technology.

SUMMARY OF THE INVENTION

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a sensor includes an RFID reader, an RFID chip, an antenna, and a sensing material. The antenna is electrically connected to the RFID chip and configured to receive signals from and transmit signals to the RFID reader. The sensing material is electrically connected to the RFID chip and has a variable electrical property. The RFID chip is configured to modulate a signal received by the antenna and drive the sensing material using the modulated signal.

In another aspect, a method for operating a sensor includes providing a sensor including an RFID chip, an antenna electrically connected to the RFID chip, and a sensing material electrically connected to the RFID chip and having a variable electrical property. A signal is sent to the RFID chip via the antenna and the signal is modulated to generate a modulated signal. The sensing material is driven using the modulated signal.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

According to the methods and devices described herein, RFID technology is employed in a sensor to reduce the effect of environmental noise, thereby allowing for more accurate assessment of the state of the sensor. Sensors according to the present disclosure comprise an RFID reader, an RFID chip, an antenna, and a sensing material. The components of the sensor may be variously arranged, as will be described in greater detail herein. While a number of sensor configurations are shown and described herein, it should be understood that the enumerated embodiments are merely exemplary, rather than being limiting, and the principles described herein may be employed in sensors having other configurations.

Figure 1:
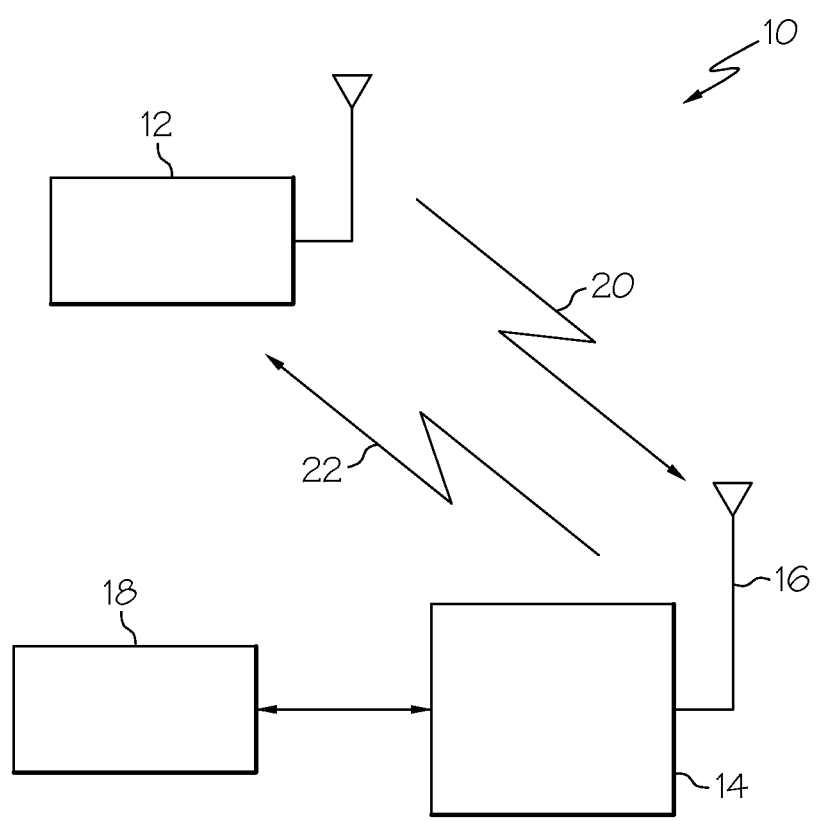
FIG. 1 is a schematic diagram of the basic structure of a sensor embodying aspects of the present disclosure.

FIG. 1 shows the basic structure of one embodiment of a sensor 10 according to the present disclosure. In the embodiment of FIG. 1, the sensor 10 comprises an RFID reader 12, an RFID chip 14, and an antenna 16 and a sensing material 18 which are electrically connected to the RFID chip 14. The RFID reader 12 is configured to generate an RF field and generate and receive RF signals. In FIG. 1, a signal generated by the RFID reader 12 (which may be a UHF signal) is identified as 20, while a signal received by or transmitted to the RFID reader 12 (which may be a UHF signal) is identified as 22. The signal 20 generated by the RFID reader 12 may be received by the antenna 16, if the antenna 16 is positioned within the RF field. The antenna 16 is configured to send a return signal 22 to the RFID reader 12 after the initial signal 20 has been processed or modified by the RFID chip 14 and/or the sensing material 18. The antenna 16 may be variously configured, being a UHF antenna in one embodiment. The antenna 16 may be configured such that its electrical properties (e.g., its impedance) remain substantially uniform during use of the sensor 10, whereas one or more electrical properties of the RFID chip 14 and/or the sensing material 18 may vary during use, as will be described in greater detail herein.

Figure 2:
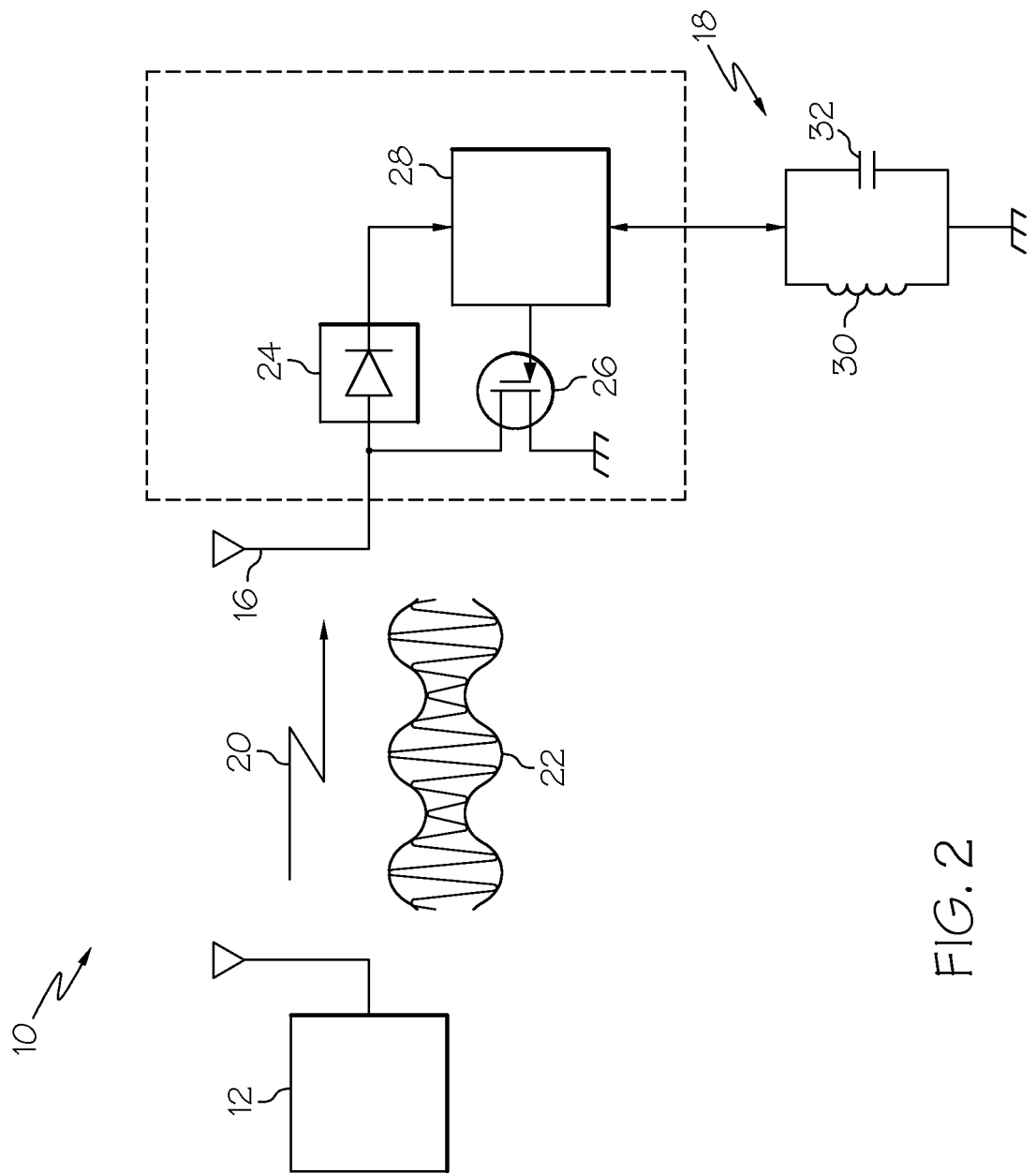
FIG. 2 is a schematic diagram of a sensor of the type shown in FIG. 1, showing an RFID chip and sensing material thereof in greater detail.

FIG. 2 shows a suitable RFID chip 14 and sensing material 18 in greater detail. In the embodiment of FIG. 2, the RFID chip 14 comprises a detector 24, a backscatter modulator 26, and a logic circuit 28 which are electrically connected together. The RFID reader 12 generates a signal 20, which is received by the antenna 16 and passed along to the detector 24. The detector 24 (illustrated in FIG. 2 as a diode) allows current to flow to the logic circuit 28 from the antenna 16, but not back from the logic circuit 28 to the antenna 16. By such a configuration, the signal must first traverse the logic circuit 28 and the sensing material 18, thereby undergoing some modification or modulation (the nature of which depends on the configuration of the logic circuit 28 and the sensing material 18) prior to being returned to the antenna 16 (via the backscatter modulator 26) for transmission to the RFID reader 12.

The backscatter modulator 26 is illustrated as a transistor and, in the embodiment of FIG. 2, serves to amplify the signal returned to the antenna 16 from the logic circuit 28. Such a backscatter modulator 26, if provided, allows the RFID chip 14 to operate at a lower frequency, thereby reducing the cost of the RFID chip 14 and the power required to operate it. In one embodiment, the logic circuit 28 may operate to so decrease the frequency of the initial signal 20 (e.g., by dividing the frequency of the signal by a factor of two). In another embodiment, the logic circuit 28 may instead operate to increase the frequency of the initial signal 20 (e.g., by multiplying the frequency of the signal by a factor of two). When modulating a characteristic of the signal, one or more of the other characteristics of the signal may be maintained substantially uniform or defined (e.g., modulating the frequency of the signal, while maintaining a defined voltage). In addition to (or instead of) modulating the frequency of the initial signal 20, the logic circuit 28 may otherwise condition the initial signal 20 prior to passing it along to the sensing material 18, so it is illustrated generically in FIG. 2.

The sensing material 18 (illustrated in FIG. 2 as a resonator comprising an inductor 30 and a capacitor 32) has a variable electrical property, such that the signal 22 produced by the antenna 16 will change according to the condition of the sensing material 18. If the sensing material 18 is provided as a resonator, as shown in FIG. 2, the variable electrical property may be the peak resonant frequency in amplitude, a defined phase state, a factor relating to the Q of the device and any combination of such factors over a defined frequency band of the inductor 30 in combination with capacitor 32. A resonator could be provided as an electrical or mechanical device and formed of any of a variety of materials including, but not limited to, piezoelectric materials and/or electro-elastic polymers, but is not otherwise limited to anything more specific than a structure in which mechanical motion is interacted with an electrical signal. Non-resonator sensing materials (e.g., a simple linear resistive sensor) and sensing materials employing other variable electrical properties may also be employed without departing from the scope of the present disclosure.

Regardless of the nature of the sensing material 18, it interacts with the modulated signal from the RFID chip 14 and returns the signal to the logic circuit 28. The returned signal is passed from the RFID chip 14 to the antenna 16 via the backscatter modulator 26 and then transmitted back to the RFID reader 12. In one embodiment, a modulated signal having a defined voltage and a varying frequency is used to drive the sensing material 18. The frequency may be varied by the logic circuit 28 in a known relationship to the initial signal 20. By measuring the power taken to drive the return signal 22, the condition of the sensing material 18 (e.g., the operating frequency) may be determined. In another embodiment, rather than measuring the power, the condition of the sensing material 18 can be determined by driving the modulated signal onto the sensing material 18 via a relatively high impedance and measuring the voltage across it as the frequency is varied. On account of the initial signal 20 having been conditioned by the RFID chip 14 prior to interacting with the sensing material 18, the effect of environmental noise is reduced, thereby allowing for more accurate assessment of the condition of the sensing material 18.

Figure 3:
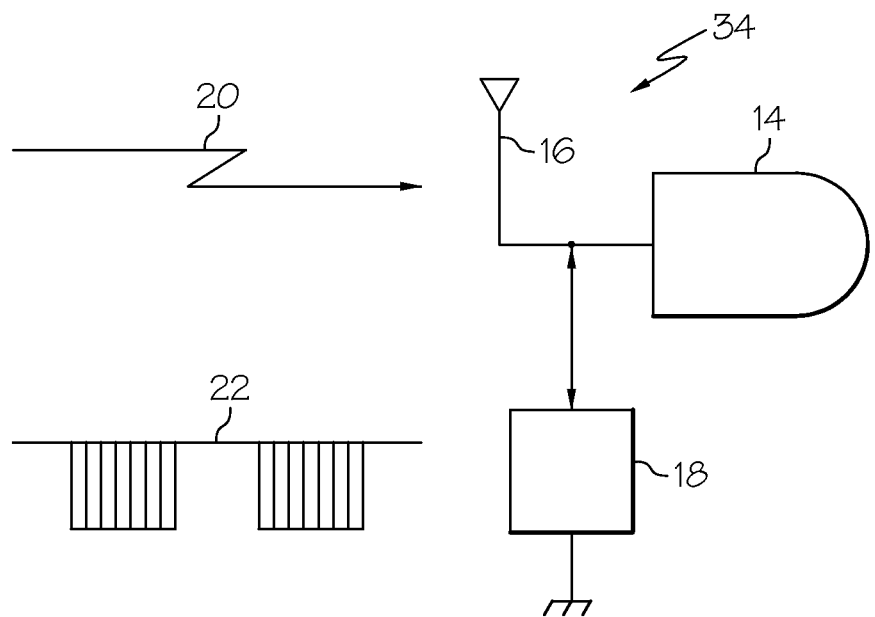
FIG. 3 is a schematic diagram of the basic structure of another embodiment of a sensor embodying aspects of the present disclosure.
Figure 4:
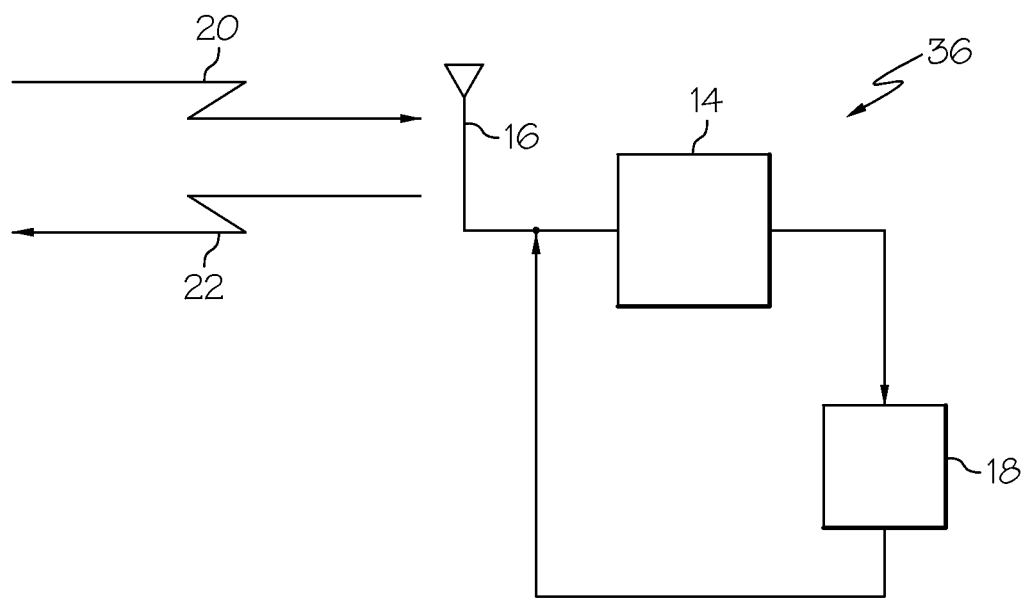
FIG. 4 is a schematic diagram of the basic structure of yet another embodiment of a sensor embodying aspects of the present disclosure.

FIGS. 3 and 4 illustrate sensors in which the signal processed by the sensing material 18 is used to modulate the input impedance of the RFID chip 14, with a signal from the RFID chip 14 being backscattered to the RFID reader by the antenna 16 to determine the condition of the sensing material 18. In the sensor 34 of FIG. 3, the sensing material 18 is electrically connected intermediate the antenna 16 and the RFID chip 14 and the signals 20 and 22 employed are alternating current, with the sensing material 18 being driven by a rectified signal. In the sensor 36 of FIG. 4, the sensing material 18 is electrically connected both upstream and downstream of the RFID chip 14.

Figure 5:
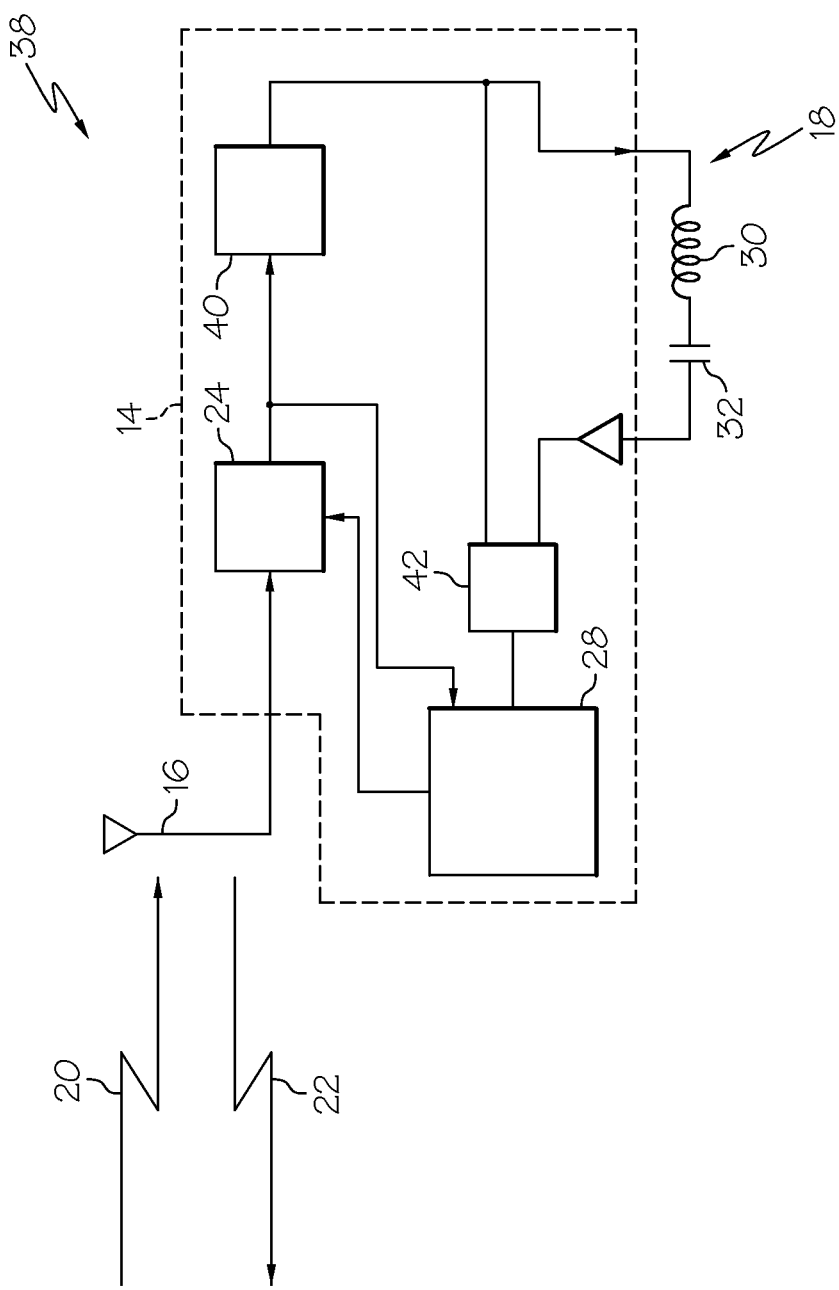
FIG. 5 is a schematic diagram of another embodiment of a sensor embodying aspects of the present disclosure.

FIG. 5 shows another alternative configuration of a sensor 38 employing an RFID reader (not shown), an antenna 16, an RFID chip 14, and a sensing material 18. In the embodiment of FIG. 5, the RFID chip 14 comprises a detector/reflector 24 and logic circuit 28, as well as a frequency modulator 40 and a phase comparator 42. A signal 20 from the RFID reader is received by the antenna 16 and passed along to the RFID chip 14, via the detector 24. The signal is then processed by the frequency modulator 40 to change its frequency (e.g., by multiplying or dividing it). The modulated signal is then passed to the phase comparator 42 and to the sensing material 18 (which is illustrated as a resonator with an inductor 30 and a capacitor 32, but is not limited to such a configuration). The modulated signal passed through the sensing material 18 is directed to the phase comparator 42, which compares it to the modulated signal from the frequency modulator 40 to determine the phase difference there between (which is a product of the modulated signal being passed through the sensing material 18). The phase difference information is passed to the logic circuit 28, which directs it to the detector/reflector 24 to be backscattered to the RFID reader by the antenna 16 as a return signal 22.

Figure 6:
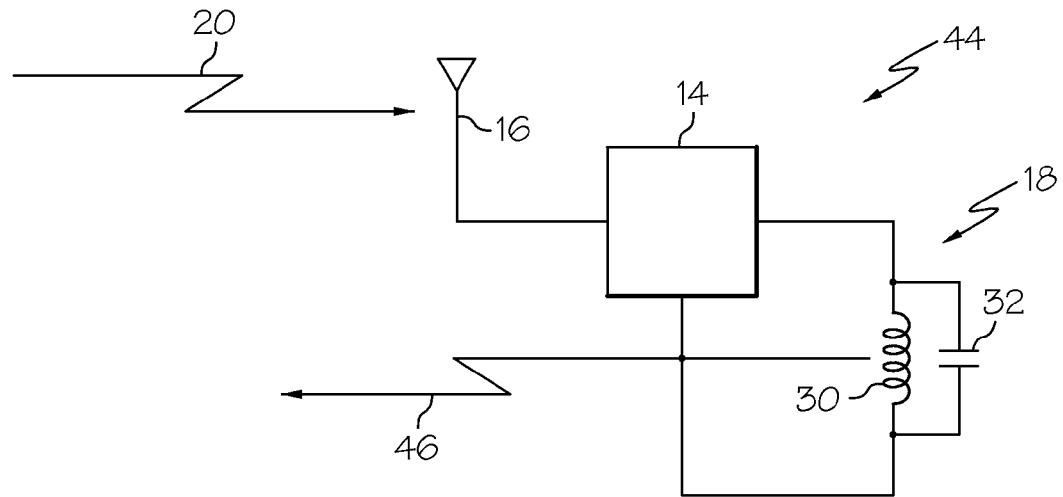
FIG. 6 is a schematic diagram of the basic structure of another embodiment of a sensor embodying aspects of the present disclosure.
Figure 7:
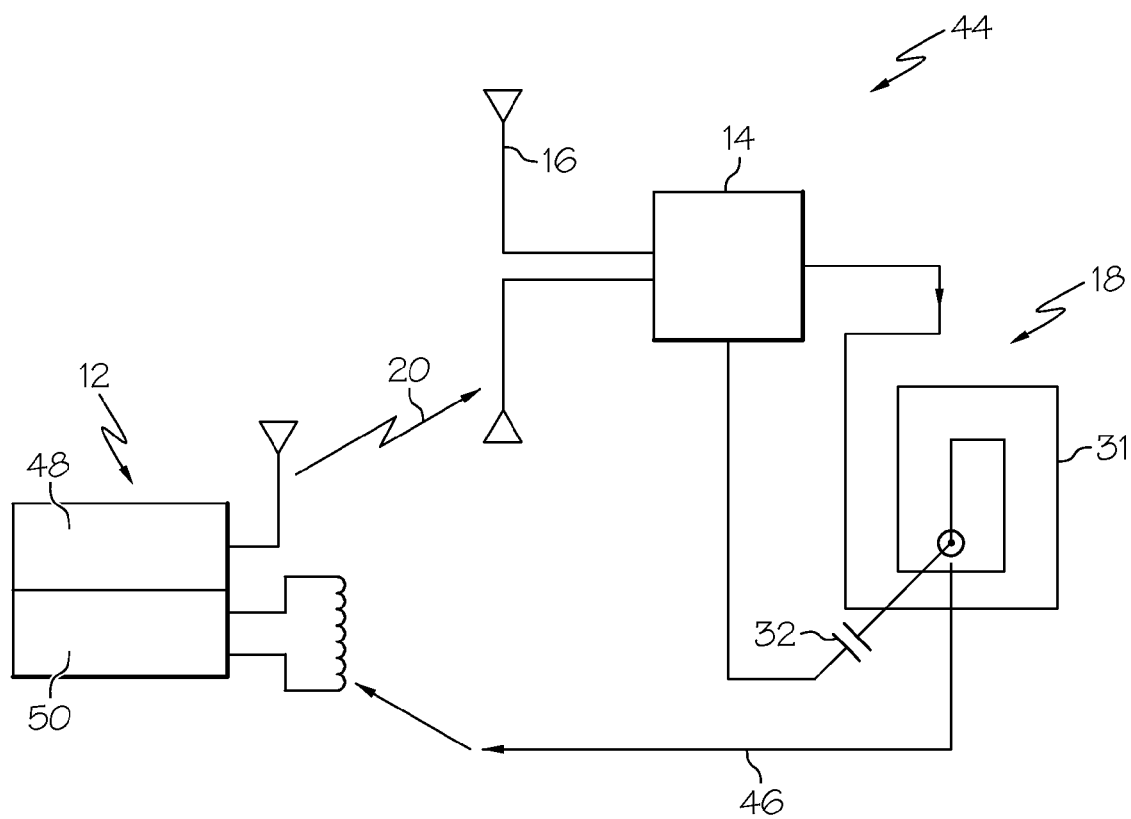
FIG. 7 is a schematic diagram of a sensor of the type shown in FIG. 6, showing an RFID reader and sensing material thereof in greater detail.

FIGS. 6 and 7 illustrate embodiments of a sensor 44 in which a return signal or radiation 46 comes from the sensing material 18 itself rather than the antenna 16. FIG. 6 shows the basic structure of such a sensor 44, with FIG. 7 showing the sensor 44 with more particularity. The sensor 44 includes an RFID reader 12 (FIG. 7), which includes a transmitter 48 configured for transmitting an initial signal 20 to an antenna 16. The antenna 16 passes the signal along to an RFID chip 14, which may be comparable to one of the RFID chips described above with reference to the embodiments of FIGS. 1-5. The RFID chip 14 conditions the signal (e.g., by modulating its frequency) and then sends a modulated signal to the sensing material 18, which is illustrated as a resonator having an inductor 30 and a capacitor 32. The inductor 30 of the sensing material 18 acts as a resonant coil to produce radiation 46 (e.g., electromagnetic, magnetic, or acoustic radiation), which is detected by a receiver 50 (e.g., a coherent magnetic receiver) of the RFID reader 12 to determine the status of the sensing material 18. The radiation 46 emitted by the sensing material 18 may be driven at a frequency equal to that the modulated signal sent from the RFID chip 14 to the sensing material 18. It is also within the scope of the present disclosure for the sensor 44 to send both radiation 46 from the sensing material 18 and a return signal from the antenna 16 to the RFID reader 12 to determine the status of the sensing material 18. In such an embodiment, the return signal from the antenna 16 may be received by the transmitter 48 of the RFID reader 12.

In addition to the sensing techniques described above, other techniques may also be employed in sensors according to the present disclosure, particularly when the sensing material is provided as a resonator. For example, the resonator may be driven with a pulsed signal from the RFID chip and the time the signal takes to fall to a defined level relative to the initial state may be measured to determine the status of the resonator. The time interval may be defined by the initial signal from the RFID reader.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof including as combinations of features that are individually disclosed or claimed herein.

What is claimed is:

1. A sensor system, comprising:
   an RFID reader;
   an RFID chip;
   an antenna electrically connected to the RFID chip and configured to receive signals from and transmit signals to the RFID reader;
   and a resonant sensing circuit comprising a resonant circuit having a resonant frequency electrically connected to the RFID chip and whose resonant frequency is affected by an environmental characteristic of interest to correspondingly generate a variable resonant frequency indicative of said environmental characteristic of interest;
   wherein the RFID chip is configured to modulate a signal received by the antenna from said reader by reducing the frequency thereof and drive the resonant sensing circuit using the modulated signal to obtain sensing circuit output from said variable resonant frequency to provide a response back to the RFID reader, and the antenna is configured to have an impedance which remains substantially uniform during use of the sensor system.

2. The sensor of claim 1, wherein the resonator comprises an inductor and a capacitor.

3. The sensor system of claim 1, wherein the RFID chip is configured to receive a signal from the resonant sensing circuit, an input impedance of the RFID chip is modulated based at least in part on the signal from the resonant sensing circuit, and the RFID chip backscatters a signal to the RFID reader via the antenna.

4. The sensor system of claim 1, wherein the RFID chip is configured to directly analyze the condition of the resonant sensing circuit and send a signal to the RFID reader via the antenna.

5. The sensor of claim 1, wherein the antenna comprises a UHF antenna.

6. The sensor system of claim 1, wherein the RFID chip is configured to drive the resonant sensing circuit using a modulated signal having a defined voltage and a varying frequency.

7. A method for operating a sensor, comprising:
   providing the sensor including an RFID chip, an antenna electrically connected to the RFID chip, and a resonant sensing circuit comprising a resonant circuit having a resonant frequency electrically connected to the RFID chip and whose resonant frequency is affected by an environmental characteristic of interest to correspondingly generate a variable resonant frequency indicative of said environmental characteristic of interest;
   wherein the RFID chip is configured to modulate a signal received by the antenna from said reader by increasing the frequency thereof and drive the resonant sensing circuit using the modulated signal to obtain sensing circuit output from said variable resonant frequency to provide a response back to the RFID reader,
   the antenna has an impedance which remains substantially uniform during use of the sensor;
   sending the signal from the RFID reader to the RFID chip via the antenna;
   modulating the signal by the RFID chip to generate the modulated signal by increasing the frequency thereof;
   driving the resonant sensing circuit using the modulated signal to obtain a sensing circuit output from said variable resonant frequency to provide a response back to the RFID reader by the RFID chip.

8. The method of claim 7, wherein said providing a sensor includes providing a sensing material comprising an inductor and a capacitor.

9. The method of claim 7, further comprising: sending a signal from the resonant sensing circuit to the RFID chip, thereby modulating an input impedance of the RFID chip based at least in part on the signal from the resonant sensing circuit; and
   backscattering a signal from the RFID chip via the antenna to provide said response.

10. The method of claim 7, further comprising:
    directly analyzing the condition of the resonant sensing circuit by the RFID chip; and
    sending a signal based at least in part on the condition of the resonant sensing circuit via the antenna to provide said response.

11. The method of claim 7, wherein said providing the sensor includes providing a UHF antenna.

12. The method of claim 7, wherein said driving the resonant sensing circuit includes driving the resonant sensing circuit using a modulated signal having a defined voltage and a varying frequency.

13. A sensor system, comprising:
    an RFID reader;
    an RFID chip;
    an antenna electrically connected to the RFID chip and configured to receive signals from and transmit signals to the RFID reader;
    and a resonant sensing circuit comprising a resonant circuit having a resonant frequency electrically connected to the RFID chip and whose resonant frequency is affected by an environmental characteristic of interest to correspondingly generate a variable resonant frequency indicative of said environmental characteristic of interest;

wherein the RFID chip is configured to modulate a signal received by the antenna from said reader by increasing the frequency thereof and drive the resonant sensing circuit using the modulated signal to obtain sensing circuit output from said variable resonant frequency to provide a response back to the RFID reader, and the antenna is configured to have an impedance which remains substantially uniform during use of the sensor system.

14. A method for operating a sensor, comprising:

providing the sensor including an RFID chip, an antenna electrically connected to the RFID chip, and a resonant sensing circuit comprising a resonant circuit having a resonant frequency electrically connected to the RFID chip and whose resonant frequency is affected by an environmental characteristic of interest to correspondingly generate a variable resonant frequency indicative of said environmental characteristic of interest;

wherein the RFID chip is configured to modulate a signal received by the antenna from said reader by reducing the frequency thereof and drive the resonant sensing circuit using the modulated signal to obtain sensing circuit output from said variable resonant frequency to provide a response back to the RFID reader, the antenna has an impedance which remains substantially uniform during use of the sensor;

sending the signal from the RFID reader to the RFID chip via the antenna;

modulating the signal by the RFID chip to generate the modulated signal by increasing the frequency thereof;

driving the resonant sensing circuit using the modulated signal to obtain a sensing circuit output from said variable resonant frequency to provide a response back to the RFID reader by the RFID chip.

* * * * *